Figure 1:
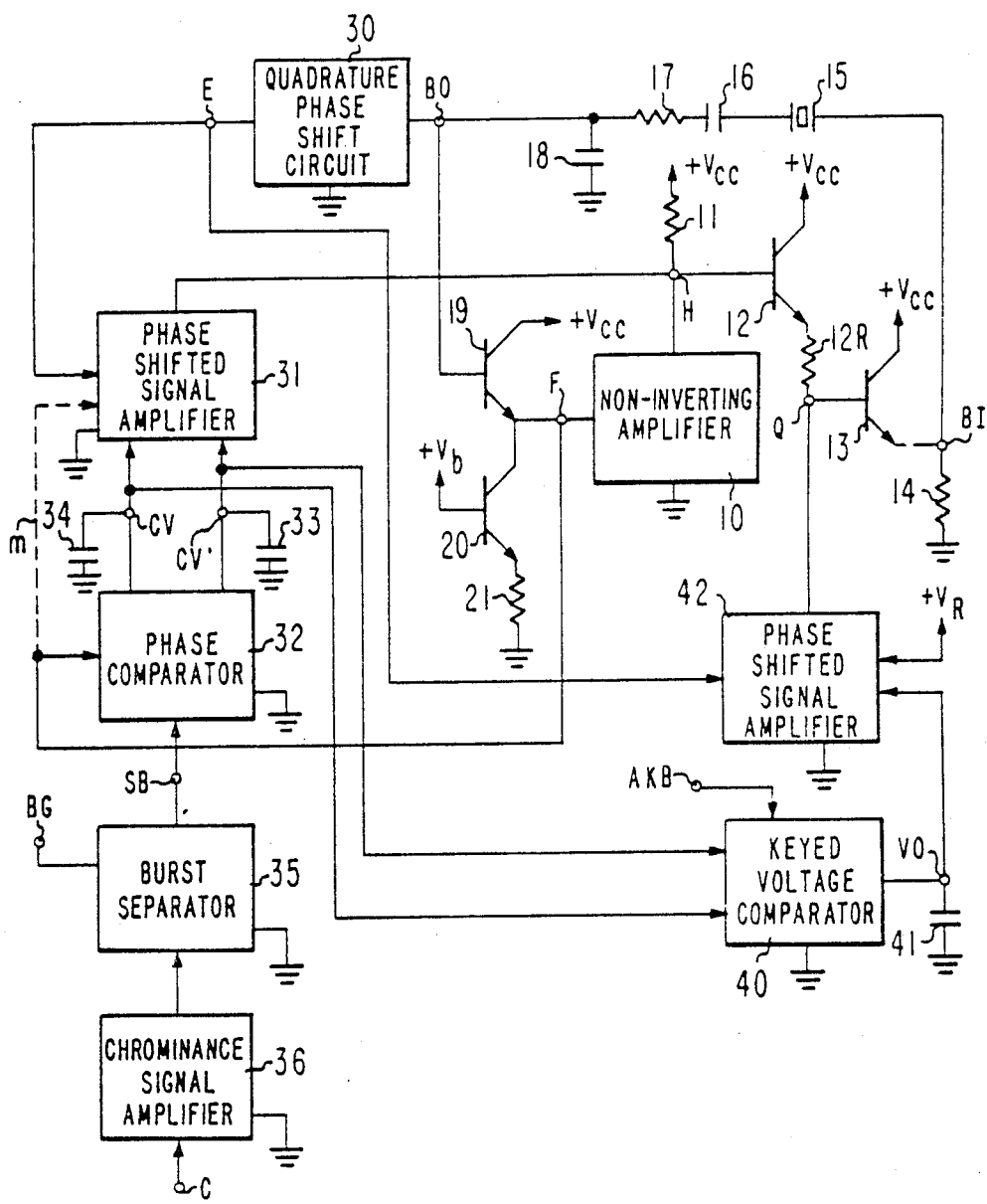

United States Patent [19]

Shanley, II

[11] Patent Number: 4,611,239
[45] Date of Patent: Sep. 9, 1986

[54] OSCILLATOR SYNCHRONIZING SYSTEM FOR ELIMINATING STATIC PHASE ERRORS

[75] Inventor: Robert L. Shanley, II, Marion County, Ind.

[73] Assignee: RCA Corporation, Princeton, N.J.

[21] Appl. No.: 666,835

[22] Filed: Oct. 31, 1984

[51] Int. Cl.⁴ .................. H04N 9/45; H04N 9/455
[52] U.S. Cl. .............................. 358/19; 358/25; 331/8; 331/17; 331/19; 331/20
[58] Field of Search ............. 358/19, 25, 21 V, 159, 358/17, 158, 28, 23; 331/10, 11, 12, 20, 8, 17, 19

[56] References Cited

U.S. PATENT DOCUMENTS

| | | | |
|---|---|---|---|
| 4,020,500 | 4/1977 | Harwood | 358/19 |
| 4,047,223 | 9/1977 | Hofmann | 358/158 |
| 4,229,759 | 10/1980 | Harwood et al. | 358/19 |
| 4,249,199 | 2/1981 | Harwood et al. | 358/19 |
| 4,485,353 | 11/1984 | Fang et al. | 331/8 |
| 4,485,354 | 11/1984 | Shanley, II et al. | 331/8 |

OTHER PUBLICATIONS

U.S. patent application Ser. No. 594,398, to Harwood. (filed 3/28/84).

Primary Examiner—John W. Shepperd
Assistant Examiner—Michael P. Dunnam
Attorney, Agent, or Firm—Eugene M. Whitacre; Paul J. Rasmussen; William H. Meagher

[57] ABSTRACT

Non-inverting amplifier, with bandpass filter in regenerative feedback path, forms color reference oscillator in a color TV receiver. Phase shift circuit, responsive to an oscillator output, supplies signals to a first phase shifted signal amplifier, which shares a load with the non-inverting amplifier, and is subject to control by complementary outputs of a phase comparator functioning to compare the phase of an oscillator output with the phase of incoming color synchronizing bursts. A voltage comparator, responsive to the respective phase comparator outputs, is periodically enabled by field rate keying pulses. The voltage comparator output controls the charging or discharging of a capacitor during the keying intervals. A second phase shifted signal amplifier, responsive to the output of the phase shift circuit, and delivering its output to the oscillator's feedback path, is subject to control in dependence upon a comparison of a control voltage derived from the voltage held by the capacitor with a reference DC voltage.

5 Claims, 2 Drawing Figures

OSCILLATOR SYNCHRONIZING SYSTEM FOR ELIMINATING STATIC PHASE ERRORS

The present invention relates generally to oscillator synchronizing systems, and particularly to synchronizing systems, of a type suitable for effecting synchronization of the color reference oscillator of a color television receiver, wherein provision is made for substantially complete avoidance of static phase errors.

A conventional approach to color synchronization in color television receivers employs an AFPC control loop to control the frequency and phase of a color reference oscillator from which reference oscillations are derived for use in demodulation of the modulated color subcarrier waves which form the chrominance component of composite color television signals processed by the color TV receiver. In the AFPC control loop, a phase detector compares the phase of an output of a VCO (voltage controlled oscillator) serving as the color reference oscillator with the phase of color synchronizing bursts (the bursts comprising oscillations of color subcarrier frequency and reference phase, which accompany the chrominance component and recur at a line rate) to develop a control voltage for application to the VCO.

Where the free-running frequency of the VCO coincides with the incoming subcarrier frequency, the loop is effective in establishing and maintaining a predetermined (quadrature) phase relationship between the respective inputs to the phase detector. When, however, the free-running frequency of the VCO differs from the incoming subcarrier frequency, the loop functions to alter the VCO's operating frequency so as to match the incoming subcarrier frequency. Under such conditions of altered operating frequency, a static phase error is a normal consequence: i.e., when the conventional AFPC loop is stabilized, the phase relationship between the phase detector inputs differs from the desired quadrature phase relationship in accordance with a phase error of a magnitude and sense dependent upon the magnitude and sense of the frequency difference required to be overcome.

In the absence of compensation for the aforementioned static phase error, there will be resultant errors in the coloring of a color image displayed in response to the color-difference signals recovered by the color demodulators of the receiver. While a color television receiver may incorporate a manual control providing a facility external to the AFPC loop for adjusting the phasing of the reference oscillations supplied to the color demodulators, reliance upon a viewer's accurate manual adjustment of such a control is a relatively unsatisfactory solution to the static phase error compensation problem.

Pursuant to the principles of the present invention, an oscillator synchronizing system, suitable for use in a color television receiver, is provided which substantially avoids introduction of a static phase error when effecting synchronization of the oscillator in instances where the oscillator's free-running frequency differs from the frequency of the synchronizing signal.

In accordance with an illustrative embodiment of the present invention, an oscillator, comprising a non-inverting amplifier with a bandpass filter coupled between output and input terminals thereof, is associated with a phase shifter receiving signals from said oscillator and a phase comparator. The phase comparator has a first input terminal receiving signals from said oscillator and a second input terminal receiving color synchronizing bursts, and develops a first control voltage having an amplitude and polarity indicative of the magnitude and sense of any departure from a quadrature phase difference between the respective signals at its input terminals. Keyed means, responsive to said first control voltage, are provided for altering the charge stored by a charge storage capacitor in a first direction when said first control voltage exhibits a first polarity, and in a second direction, opposite to said first direction, when said first control voltage exhibits a second polarity, during periodically recurring keying intervals. The magnitude of charge alteration effected during a keying interval is dependent upon the magnitude of the first control voltage. A second control voltage is derived from the voltage appearing across the charge storage capacitor.

First controlled means, responsive to signals from the output terminal of the phase shifter and to the first control voltage, are provided for delivering phase shifted signals to the bandpass filter with an amplitude and polarity dependent upon the amplitude and polarity of the first control voltage. Second controlled means, responsive to signals from the output terminal of the phase shifter, to the second control voltage, and to a reference DC voltage, are also provided for supplying to said bandpass filter additional phase shifted signals of a magnitude and polarity dependent upon the magnitude and sense of the difference, if any, between the respective magnitudes of the second control voltage and the reference DC voltage.

Desirably, the aforementioned keying intervals recur at a field rate, with each keying interval timed to coincide with a portion of the vertical blanking interval of the received signals which encompasses a plurality of successive line intervals. Also, desirably the color synchronizing bursts delivered to the phase comparator are derived from a burst separator responsive to keying pulses normally recurring at a line rate but absent throughout said blanking interval portion.

Illustratively, the keyed means for altering the stored charge includes first and second transistors with emitter electrodes commonly connected to a current source enabled only during said keying intervals recurring at a field rate, and a current mirror responsive to the collector current of the second transistor and provided with an output transistor, of a conductivity type opposite to that of the first and second transistors, and having its collector electrode direct current conductively connected to the collector electrode of the first transistor. In use of keyed means of such form the first control voltage is applied between the base electrodes of the first and second transistors, with the resultant second control voltage subject to derivation from the voltage appearing across the charge storage capacitor which is coupled between the collector electrode of the output transistor and a point of reference potential.

Figure 2:
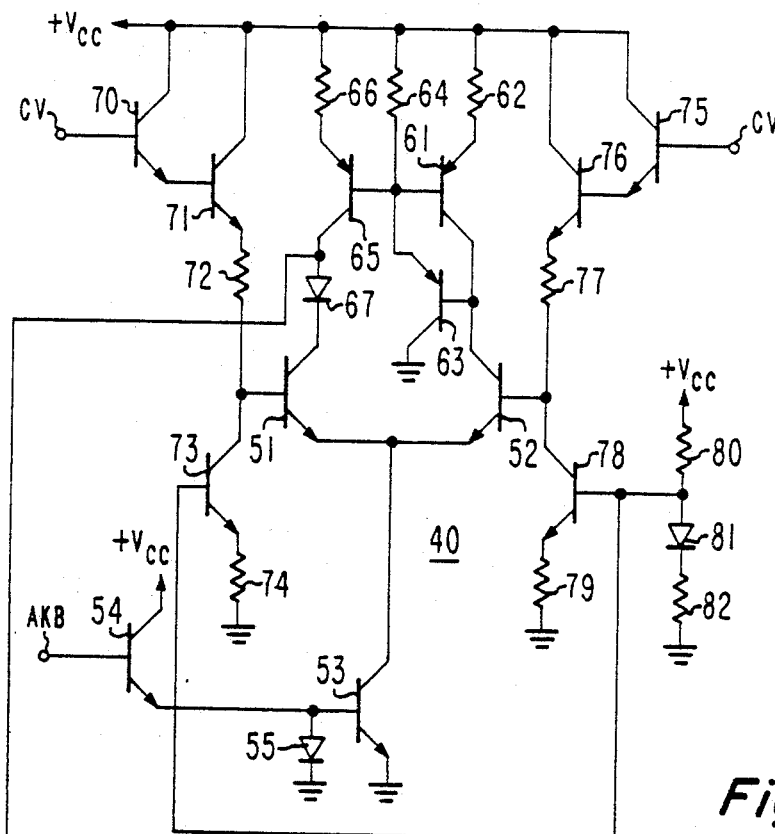
Figure 2:
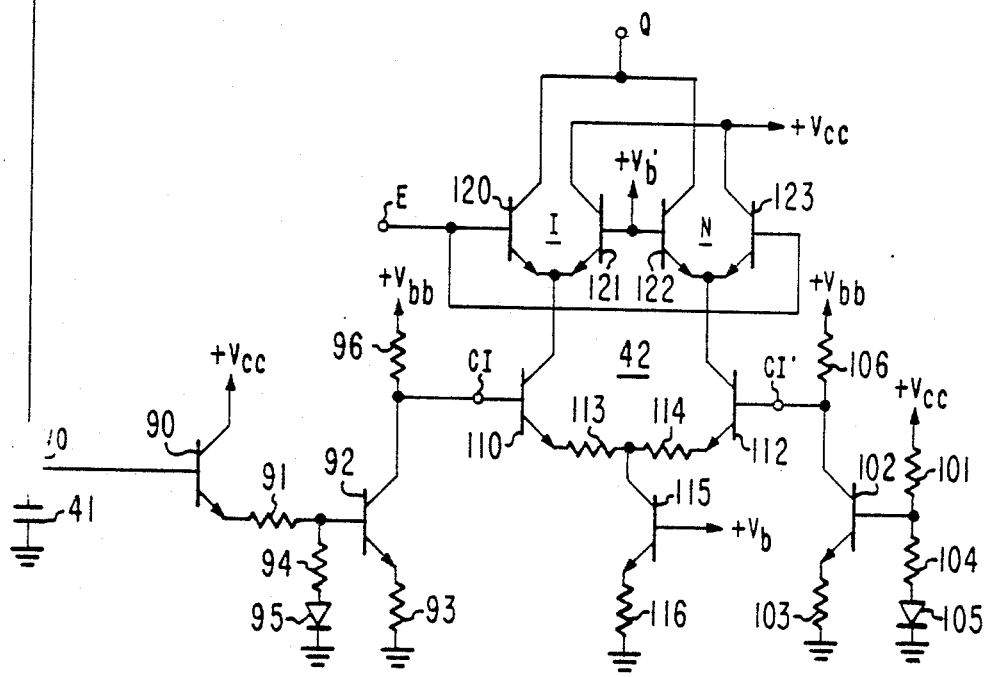

In the accompanying drawings:

FIG. 1 illustrates, partially schematically and partially by block representation, a portion of a color television receiver incorporating an oscillator synchronizing system in accordance with an embodiment of the present invention; and FIG. 2 illustrates schematically apparatus which may be employed advantageously in implementing selected functions of the oscillator synchronizing system of FIG. 1.

In the color television receiver portion illustrated in FIG. 1, a non-inverting amplifier 10 is provided with sufficient positive feedback via a bandpass filter linking its output and input terminals to enable it to operate as an oscillator at an operating frequency lying within the filter's passband.

The output of non-inverting amplifier 10 is developed across a load resistor 11, connected between amplifier terminal H and the positive terminal ($+V_{cc}$) of an operating potential supply. Terminal H is coupled to a bandpass filter input terminal BI via a pair of cascaded emitter follower stages (employing respective NPN transistors 12, 13).

Transistor 12 is disposed with its base electrode directly connected to terminal H, with its collector electrode directly connected to the $+V_{cc}$ supply terminal, and with its emitter electrode connected via a resistor 12R to a terminal (Q) directly connected to the base electrode of emitter-follower transistor 13. Transistor 13 has its collector electrode directly connected to the $+V_{cc}$ supply terminal, and its emitter electrode directly connected to the bandpass filter input terminal BI, and returned to the negative terminal (illustratively at ground potential) of the operating potential supply via an emitter resistor 14.

An additional emitter-follower stage (employing NPN transistor 19) serves to couple a bandpass filter output terminal BO to the input terminal (F) of the non-inverting amplifier 10. The base electrode of transistor 19 is directly connected to terminal BO, while its emitter electrode is directly connected to terminal F, and its collector electrode is directly connected to supply terminal $+V_{cc}$. An NPN transistor 20 functions as a current source for the emitter-follower transistor 19. Transistor 20 is disposed with its collector electrode directly connected to terminal F, with its base electrode directly connected to the positive terminal ($+V_b$) of a bias potential supply, and with its emitter electrode returned to ground via an emitter resistor 21.

A regenerative feedback path between the output and input terminals of the non-inverting amplifier 10 is completed by the disposition of a relatively narrowband bandpass filter between the aforementioned filter terminals BI and BO, the band pass filter being formed by the series combination of a piezoelectric crystal 15 and a capacitor 16 disposed in series with a (Q-determining) resistor 17 between terminals BI and BO. The parameters of crystal 15 and capacitor 16 are selected so that these elements exhibit series resonance at (or in the immediate vicinity of) the nominal color subcarrier frequency of the color TV signals supplied to the receiver (e.g., 3,579,545 Hz., in the instance of signals of the NTSC type). Capacitor 16 may, for example, be variable, to provide a facility for setting the free-running frequency of the oscillator. The resistance value of the resistor 17 is selected to establish a suitable narrow bandwidth (e.g., 1000 Hz.) for the bandpass filter characteristic of the feedback path. A capacitor 18, coupled between terminal BO and ground, cooperates with resistor 17 to provide significant attenuation for harmonics of the desired operation frequency to substantially preclude the sustaining of oscillations at such higher frequencies.

For the purpose of synchronizing the above-described oscillator in frequency and phase with a color subcarrier reference of incoming color television signals, the system of FIG. 1 includes a phase comparator 32. The local input to phase comparator 32 comprises oscillations derived from terminal F at the input of amplifier 10. A chrominance signal amplifier 36 is responsive to the chrominance component of incoming signals, appearing at terminal C and accompanied by periodic synchronizing bursts of oscillations of color subcarrier frequency and a reference phase. An output of chrominance signal amplifier 36 is supplied to a burst separator 35, which is gated (under the control of burst gating pulses from terminal BG) to deliver separated color synchronizing bursts to the other input (terminal SB) of the phase comparator 32.

Phase comparator 32 functions to develop an output indicative of the phase relationship between the respective comparator input signals. Illustratively, phase comparator 32 is of a type developing push-pull outputs, providing complementary control voltages across respective filter capacitors (33,34) at respective output terminals CV and CV', with the difference between said control voltages having a magnitude and polarity indicative of the magnitude and sense of any departure from a desired quadrature phase relationship which may exist between the respective comparator inputs. Apparatus that may desirably be used for implementing the functions of phase comparator 32 is illustrated, for example, in U.S. Pat. No. 4,229,759—Harwood, et al.

The control voltages at terminals CV and CV' are used to control the operation of a phase shifted signal amplifier 31 which shares load resistor 11 with the non-inverting amplifier 10. Signals for application to the signal input terminal of amplifier 31 are derived from the output terminal E of a quadrature phase shift circuit 30, which receives at its input oscillations appearing at the bandpass filter output terminal BO. Illustratively, the parameters of phase shift circuit 30 are such as to subject the oscillations from terminal BO to a phase lag of substantially 90°.

The control of amplifier 31 is such that when a balance between the control voltages at terminals CV and CV' exists (reflecting the presence of a quadrature phase relationship between the respective inputs to comparator 32), amplifier 31 develops no signal output and the free-running operation of the local color oscillator is undisturbed thereby. When a control voltage unbalance of one sense exists (reflecting a departure of a first sense from the desired quadrature relationship between comparator inputs), amplifier 31 develops an inverted version of the phase shifted signals appearing at terminal E across the shared load resistor 11, of a magnitude dependent upon the magnitude of the unbalance. When a control voltage unbalance of the opposite sense exists (reflecting a departure of a second sense from the desired quadrature phase relationship between comparator inputs), amplifier 31 develops a non-inverted version of the phase shifted signals appearing at terminal E across the shared load resistor 11, of a magnitude dependent upon the magnitude of such opposite sense unbalance. The effect of such controlled injection of phase shifted signals is alteration of the oscillator operation in a sense to minimize departures from the desired quadrature phase relationship between the comparator inputs so as to effect synchronization of the oscillator with the received color synchronizing bursts.

As thus far described, the oscillator synchronizing system of FIG. 1 is similar to the system described in U.S. Pat. No. 4,020,500—Harwood. An illustrative configuration, suitable for implementation of the function of the phase shifted signal amplifier 31, is shown in said U.S. patent. Reference may also be made to the copending U.S. patent application, Ser. No. 383,263, (now U.S. Pat. No. 4,485,353) of T. Fang, et al., for a description of a modification of such illustrative configuration, which may alternatively be used, with control symmetrization advantages. In use of such a modification, a matrixing of the phase shifter output with the phase shifter input is desirably employed to develop the signal input for the phase shifted signal amplifier 31. For such matrixing purposes, additional delivery of signals from terminal F (at the input of non-inverting amplifier 10) to amplifier 31 is appropriate, as indicated by the dotted-line connector "m" in FIG. 1.

To address the previously discussed problem of "static phase error" in the operation of the synchronizing system thus far described, the arrangement of FIG. 1 includes additional apparatus: a keyed voltage comparator 40; a charge storage capacitor 41; and an additional phase shifted signal amplifier 42.

The keyed voltage comparator 40 is periodically enabled during keying intervals determined by field rate keying pulses supplied to a keying input of comparator 40 from terminal AKB. The control voltages appearing at terminals CV and CV' are applied as signal inputs to voltage comparator 40. The charge storage capacitor 41 is connected between the comparator's output terminal VO and ground.

In the presence of a difference of one polarity between the respective control voltages at terminals CV, CV' during a keying interval, the charge stored by capacitor 41 is subject to alteration in a first direction, with the magnitude of the charge alteration effected during said keying interval being dependent upon the magnitude of said difference. In the presence of an opposite polarity difference between the respective control voltages at terminals CV, CV' during a keying interval, the charge stored by capacitor 41 is subject to alteration in a second direction, opposite to said first direction, with the magnitude of the charge alteration effected during said keying interval being dependent upon the magnitude of said opposite polarity difference. Between keying intervals, capacitor 41 operates in a "hold" state, retaining its stored charge. In the absence of a difference between the control voltages at terminals CV, CV', i.e., in the presence of control voltage balance, no charge alteration occurs during a keying interval.

The additional phase shifted signal amplifier 42 receives, as a signal input, phase shifted signals from the output terminal E of the quadrature phase shift circuit 30, and, as control inputs, a control voltage responsive to the voltage appearing across capacitor 41, and a reference DC voltage ($+V_R$). In the presence of a balance between the control inputs, no output is developed by the additional phase shifted signal amplifier 42. In the presence of an unbalance of one polarity between the control inputs, amplifier 42 functions to deliver an inverted version of the phase shifted signals appearing at terminal E to terminal Q (at the base electrode of emitter-follower transistor 13 which delivers signals to the bandpass filter input terminal BI), with a magnitude dependent upon the degree of unbalance. In the presence of an unbalance of the opposite polarity between the control inputs, amplifier 42 functions to deliver a non-inverted version of the phase shifted signals appearing at terminal E to terminal Q, with a magnitude dependent upon the degree of such unbalance.

Illustratively, the timing of the field rate keying pulses supplied to terminal AKB is such that each keying interval for enabling comparator 40 coincides with a post-sync portion of the vertical blanking interval of the received color television signals and encompasses a plurality (e.g., seven) of successive line intervals. Field rate keying pulses of such timing and width are conveniently available, for example, in color television receivers of a type employing automatic control of color kinescope biasing in the manner described in the copending U.S. patent application, Ser. No. 434,314 (now U.S. Pat. No. 4,484,228) of R. P. Parker. Reference may be made to said copending Parker application, for example, for a description of apparatus suitable for use in generation of such field rate keying pulses.

The timing of the line rate, burst gating pulses supplied to terminal BG of burst separator 35 is such as to coincide with the horizontal blanking interval "back-porch" location of successive color synchronizing bursts. Desirably, however, the nature of the gating pulse train appearing at terminal BG is such that a field rate interruption of gating pulse appearances occurs so that burst gating pulses are absent throughout each period encompassed by the keying pulses appearing at terminal AKB. A burst gating pulse train of such a periodically interrupted character is also conveniently available in certain color television receivers of the above-described type employing automatic control of color kinescope biasing (a receiver of the form described in the RCA Color Television Receiver Basic Service Data booklet denoted 1984 CTC 131 being one example). Reference may be made to the copending U.S. patent application, Ser. No. 561,331, (now U.S. Pat. No. 4,555,722) of L. Harwood, et al., and the copending U.S. patent application, Ser. No. 561,333, (now U.S. Pat. No. 4,558,355) of J. Hettiger, for example, for a description of apparatus serving to develop a gating pulse train of the desired interrrupted character.

It will be noted from the description above that the periods of effective operation for phase comparator 32 do not overlap with the periods of enabling for voltage comparator 40. During the vertical blanking interval portion when voltage comparator 40 is enabled by a keying pulse from terminal AKB, the absence of burst gating pulse appearances at terminal BG precludes delivery of a color synchronizing burst input to phase comparator 32. However, during each period of inactivity for voltage comparator 40 which intervenes between successive field rate keying pulses, there are a large number of line intervals in which a synchronizing burst input is supplied for comparison with the local oscillations in phase comparator 32.

Phase comparator 32 and amplifier 31 cooperate with the local color oscillator constituted by amplifier 10 and its regenerative feedback path to form a phase locked loop, the loop functioning to lock the oscillator frequency and phase to the incoming color synchronizing bursts. When the free-running frequency of the oscillator is equal to the subcarrier frequency of the incoming synchronizing bursts, the loop will stabilize in a condition assuring that the local oscillations at terminal F bear a desired quadrature relationship to the reference phase of the incoming bursts. Under such conditions, accurate phasing of reference oscillations derived from the oscillator for application to the receiver's color demodulators (not shown) is readily attainable. In the stabilized condition of the loop, the control voltages at terminals CV and CV' will be in balance; i.e., the difference therebetween will be substantially zero.

However, when the phase locked loop achieves locking in instances where the free-running frequency of the local oscillator is not equal to the subcarrier frequency of the incoming bursts, the loop will have stabilized in a condition appropriate to achievement of an alteration of the oscillator frequency; i.e., in a condition requiring the continued presence of an error voltage DC component in the output of comparator 32. Thus, the loop stabilizes in a condition in which the local oscillations at terminal F depart from the desired quadrature phase relationship with the reference phase of the incoming bursts, such departure constituting a static phase error. The magnitude and sense of this static phase error is dependent upon the magnitude and sense of the frequency difference required to be overcome. Inaccuracy of phasing of the reference oscillations supplied to the color demodulators is a consequence of the static phase error existence, with such inaccuracy translating into hue errors in the displayed color image in color television receivers of the NTSC type (and translating into saturation errors in the displayed color image in color television receivers of the PAL type).

The system of FIG. 1, however, does not rely solely upon the above-discussed phase locked loop for control of the local oscillator, but rather includes additional apparatus (40, 41, 42) which can function to substantially eliminate the static phase error and its undesirable consequences, as explained below.

For the purposes of explanation, it is assumed that there exists a difference betweeen the burst subcarrier frequency and the free-running frequency of the oscillator constituted by amplifier 10 and its regenerative feedback path, and that, after a succession of line intervals during which phase comparator 32 has functioned to compare incoming bursts with the local oscillations, the phase locked loop has achieved lock. There now exists a stabilized difference between the voltages at terminals CV and CV' of a particular sense and magnitude (representative of the static phase error). During the field rate keying interval following lock attainment, the aforementioned voltage difference is applied to the control inputs of voltage comparator 40, and an alteration of the charge stored by output capacitor 41 takes place, the sense and magnitude of the alteration being determined by the sense and magnitude of the input voltage difference. The resultant change in the voltage across capacitor 41 introduces an imbalance in the control inputs of amplifier 42. The consequence of the imbalance is injection of phase shifted signals into the oscillator feedback path by amplifier 42. The imbalance is held throughout the succeeding field.

Following the aforementioned keying interval, the phase locked loop, now destabilized due to the injection by amplifier 42, seeks anew to attain lock during the line intervals of the succeeding field. When lock is attained under the newly prevailing conditions, the loop will have stabilized with a reduced static phase error, i.e., with a stabilized difference between the voltage at terminals CV and CV' of lessened magnitude. From the point of view of the phase locked loop, the operation of the apparatus 40, 41, 42 has effected an adjustment of the free-running frequency of the oscillator in a direction reducing the difference relative to the burst subcarrier frequency.

In the next field rate keying interval, further charge alteration (of lesser magnitude) occurs. From the point of view of the phase locked loop, the operation of the apparatus 40, 41, 42 has now effected a further adjustment of the free-running frequency of the oscillator, reducing still further the difference relative to the burst subcarrier frequency. Lock is attained during the succeeding field with a static phase error of further reduced magnitude.

It will be seen from the above, that in a succession of fields, there is a convergence to a condition where the phase locked loop locks up with static phase error substantially completely eliminated. The phase comparator 32 is effectively relieved of the burden of exhibiting an error voltage DC component in its output to sustain an alteration of the oscillator's operating frequency. Instead, the requisite DC component has been effectively stored by the capacitor 41 of the auxiliary apparatus 40, 41, 42. The accuracy of the phasing for the reference oscillations to be delivered to the receiver's color demodulators is left undisturbed by the DC component storage in the auxiliary apparatus.

FIG. 2 provides a schematic showing of circuit arrangements which may be advantageously employed to implement the functions of the keyed voltage comparator 40 and amplifier 42 of the system of FIG. 1.

In FIG. 2, the comparator 40 comprises a differential amplifier employing a pair of NPN transistors 51, 52 with interconnected emitter electrodes connected to the collector electrode of an NPN current source transistor 53. A diode 55, with its anode connected to the base electrode of transistor 53 and its cathode grounded, shunts the base-emitter path of the current source transistor 53. The coupling of field rate keying pulses (of positive-going nature) to the base electrode of transistor 53 to periodically enable the comparator 40 is effected via the base-emitter path of NPN emitter-follower transistor 54, disposed with its collector electrode directly connected to the $+V_{cc}$ supply terminal, and with its base electrode directly connected to the keying pulse input terminal AKB.

The control voltage appearing at comparator output terminal CV is coupled to the base electrode of the differential amplifier transistor 51 via an emitter-follower stage employing NPN transistor 70, in cascade with a level shifting stage incorporating an NPN emitter-follower transistor 71 and a dropping resistor 72. Transistor 70 is disposed with its collector electrode directly connected to the $+V_{cc}$ supply terminal, with its base electrode directly connected to terminal CV, and with its emitter electrode directly connected to the base electrode of transistor 71. Transistor 71 is disposed with its collector electrode directly connected to the $+V_{cc}$ supply terminal, and with its emitter electrode connected via resistor 72 to the base electrode of amplifier transistor 51. An NPN transistor 73 serves as a current source for the level shifting stage, with the collector electrode of transistor 73 directly connected to the base electrode of transistor 51, and with the emitter electrode of transistor 73 returned to ground via an emitter resistor 74.

Similarly, the control voltage appearing at comparator output terminal CV' is coupled to the base electrode of the differential amplifier transistor 52 via an emitter-follower stage employing NPN transistor 75, in cascade with a level shifting stage incorporating an NPN emitter-follower transistor 76 and a dropping resistor 77. Transistor 75 is disposed with its collector electrode directly connected to the $+V_{cc}$ supply terminal, with its base electrode directly connected to terminal CV', and with its emitter electrode connected via resistor 77 to the base electrode of differential amplifier transistor 52. An NPN transistor 78 serves as a current source for the level shifting stage, with the collector electrode of transistor 78 directly connected to the base electrode of transistor 52, and with the emitter electrode of transistor 78 returned to ground via an emitter resistor 79.

The anode of a diode 81 is connected via a resistor 80 to the $+V_{cc}$ supply terminal, while the cathode of diode 81 is returned to ground via a resistor 82. The elements 80, 81, 82 form a voltage divider across the operating potential supply, with the divider output, at the anode of diode 81, supplied as a bias voltage to the base electrodes of the aforementioned current source transistors 73, 78.

The collector current of the differential amplifier transistor 52 serves as the input current to a current mirror arrangement employing PNP transistors 61, 63, 65. Transistor 61 is disposed with its emitter electrode returned to the $+V_{cc}$ supply terminal via an emitter resistor 62, and with its collector electrode directly connected to the collector electrode of amplifier transistor 52 and to the base electrode of transistor 63. The collector electrode of transistor 63 is grounded, while the emitter electrode of transistor 63 is directly connected to the base electrode of transistor 61, and connected via a resistor 64 to the $+V_{cc}$ supply terminal. Transistor 65, which serves as the output transistor of the current mirror arrangement, is disposed with its base electrode directly connected to the base electrode of transistor 61, with its emitter electrode returned to the $+V_{cc}$ supply terminal via an emitter resistor 66, and with its collector electrode connected via diode 67 to the collector electrode of amplifier transistor 51. The poling of the linking diode 67 is such that its anode is connected to the collector electrode of transistor 65.

The voltage comparator output terminal VO is directly connected to the collector electrode of transistor 65. The voltage comparator's output storage capacitor 41 is coupled between terminal VO and ground. When a difference between the control voltages at terminals CV, CV' exists during a keying interval with a polarity such that CV' is more positive than CV, then the collector current of transistor 65 (mirroring the collector current of amplifier transistor 52) exceeds the collector current drawn by amplifier transistor 51. The excess flows as a charging current for capacitor 41 during such a keying interval, resulting in an elevation (in the positive direction) of the potential at terminal VO. The potential at terminal VO is held at the elevated level throughout the succeeding field.

In contrast, when a difference between the control voltages at terminals CV, CV' exists during a keying interval with a polarity such that CV is more positive than CV', then the current supplied by the mirror output transistor 65 is insufficient to meet the demand for current by amplifier transistor 51. The deficiency is remedied by the drawing of a discharging current from capacitor 41 during such a keying interval, resulting in a depression of the potential at terminal VO. The potential at terminal VO is held at the depressed level throughout the succeeding field.

In FIG. 2, the phase shifted signal amplifier 42 includes a pair of differential amplifiers I and N. Differential amplifier I includes a pair of NPN transistors 120, 121 with interconnected emitter electrodes, while differential amplifier N includes a pair of NPN transistors 122, 123 with interconnected emitter electrodes.

The base electrodes of transistors 120 and 123 are directly connected to terminal E (the output terminal of the phase shift circuit 30 of the system of FIG. 1) at which phase shifted oscillations appear. The base electrodes of transistors 121 and 122 are maintained at an appropriate bias potential via their direct connection to the positive terminal ($+V_b'$) of a bias potential supply. The collector electrodes of transistors 121 and 123 are direclty connected to the $+V_{cc}$ supply terminal, while the collector electrodes of transistors 120 and 122 are directly connected to output terminal Q. (In the system of FIG. 1, terminal Q is at the base electrode of the emitter-follower which drives the bandpass filter in the oscillator's regenerative feedback path, and the series combination of resistor 12R and the emitter-collector path of transistor 12 provides a direct current path between terminal Q and the $+V_{cc}$ supply terminal).

It will be seen that differential amplifier I is disposed to deliver an inverted version of the phase shifted oscillations from terminal E to output Terminal Q, while differential amplifier N is disposed to deliver a non-inverted version of the phase shifted oscillations from terminal E to output terminal Q. If the gains of the differential amplifiers I and N are equal, their respective outputs mutually cancel so that no injection of phase shifted oscillations into the oscillator's loop is effected by amplifier 42. If, however, the gains of differential amplifiers I and N differ, phase shifted signal injection occurs, with the magnitude of the signal injection dependent upon the magnitude of gain difference, and the relative polarity of the injected signals dependent upon the sense of the gain difference.

Differential gain control of the respective amplifiers I and N is effected by a gain control system which includes a pair of NPN transistors 110 and 112 disposed with their emitter electrodes interconnected via the series combination of resistors 113 and 114. Current is supplied to the emitter electrodes of transistors 110 and 112 by an NPN current source transistor 115, disposed with its collector electrode directly connected to the junction of resistors 113 and 114, with its base electrode directly connected to the $+V_b$ bias supply terminal, and with its emitter electrode returned to ground via emitter resistor 116. Transistor 110, disposed with its collector electrode directly connected to the interconnected emitter electrodes of transistors 120 and 121 serves as a current source for differential amplifier I. Transistor 112, disposed with its collector electrode directly connected to the interconnected emitter electrodes of transistors 122 and 123, serves as a current source for differential amplifier N.

A voltage divider provided for bias supply purposes includes the series combination of resistor 101, resistor 104, and forward-biased diode 105, connected, in the order named, between the $+V_{cc}$ supply terminal and ground. A bias voltage, developed at the junction of the divider resistors 101 and 104 is supplied to the base electrode of an NPN transistor 102, disposed with its emitter electrode returned to ground via an emitter resistor 103. The collector electrode of transistor 102 is directly connected to the control input terminal CI', and via a resistor 106 to the positive terminal ($+V_{bb}$) of an operating potential supply. The current drawn by transistor 102 through resistor 106 establishes a reference DC input potential (referred to as $+V_R$ in the description of FIG. 1) at the control input terminal CI', which is directly connected to the base electrode of transistor 112.

A second control input terminal (CI) is directly connected to the base electrode of transistor 110. The collector electrode of an NPN transistor 92 is directly connected to terminal CI, and via a resistor 96 to the $+V_{bb}$ supply terminal, while the emitter electrode of transistor 92 is returned to ground via an emitter resistor 93. The series combination of a resistor 94 and a forward biased diode 95 is connected between the base electrode of transistor 92 and ground. The current drawn by transistor 92 through resistor 96, which determines the control voltage at control input terminal CI, is subject to control by the comparator output voltage across capacitor 41. This control is enabled by the coupling of comparator output terminal VO to the base electrode of transistor 92 via the series combination of the base-emitter path of an NPN emitter-follower transistor 90 and resistor 91. The collector electrode of transistor 90 is directly connected to the $+V_{cc}$ supply terminal.

At the center of the range of variation for the comparator output voltage at terminal VO, balance is established between the control potential at terminal CI and the reference potential at terminal CI'. In the balanced condition, equal collector currents for transistors 110 and 112 result in matched gains for the differential amplifiers I and N and mutual cancellation of their outputs. Lowering of the comparator output voltage below the range center elevates the control potential at terminal CI relative to the reference DC input, increasing the gain of amplifier I and decreasing the gain of amplifier N, so as to effect an injection of an inverted verison of the phase shifted signals from terminal E. In contrast, elevating of the comparator output voltage above the range center lowers the control potential at terminal CI relative to the reference DC input, decreasing the gain of amplifier I and increasing the gain of amplifier N, so as to effect an injection of a non-inverted version of the phase shifted signals from terminal E.

What is claimed is:

1. In a color television receiver subject to reception of composite color television signals inclusive of deflection synchronizing components of respective line and field rates, and respective luminance and chrominance components, said chrominance component comprising color subcarrier waves modulated by color-difference signal information indicative of the coloring of a scene and accompanied by color synchronizing information in the form of bursts of oscillations of subcarrier frequency and reference phase recurring at a line rate; an oscillator synchronizing system comprising:

an oscillator comprising a non-inverting amplifier having an input terminal, and an output terminal, and a bandpass filter coupled between said output terminal and said input terminal;

a phase shifter having an input terminal coupled to receive signals from said oscillator and having an output terminal;

a phase comparator, having a first input terminal coupled to receive signals from said oscillator and a second input terminal coupled to receive said color synchronizing bursts, said phase comparator developing a first control voltage having an amplitude and polarity indicative of the magnitude and sense of any departure from a quadrature phase difference between the respective signals appearing at its input terminals;

first controlled means, responsive to signals appearing at said phase shifter output terminal and to said first control voltage, for delivering phase shifted signals to said bandpass filter with an amplitude and polarity dependent upon the amplitude and polarity of said first control voltage;

a charge storage capacitor;

keyed means, responsive to said first control voltage, for altering the charge stored by said capacitor in a first direction when said first control voltage exhibits a first polarity and in a second direction, opposite to said first direction, when said first control voltage exhibits a second polarity, during periodically recurring keying intervals; the magnitude of the charge alteration effected during a keying interval being dependent upon the magnitude of said first control voltage;

second controlled means, independent of said first controlled means, and responsive to signals appearing at said phase shifter output terminal, to a second control voltage derived from the voltage appearing across said charge storage capacitor, and to a reference DC voltage, for supplying to said bandpass filter additional phase shifted signals of a magnitude and polarity dependent upon the magnitude and sense of the difference, if any, between the respective magnitudes of said second control voltage and said reference DC voltage.

2. Apparatus in accordance with claim 1 wherein said keying intervals recur at a field rate.

3. Apparatus in accordance with claim 2 wherein each of said keying intervals is timed to coincide with a portion of the vertical blanking interval of the received composite color television signals, said portion having a duration encompassing a plurality of successive line intervals.

4. Apparatus in accordance with claim 3 also including additional keyed means for separating said color synchronizing bursts from said received composite color television signals in response to keying pulses normally recurring at line rate but absent throughout said vertical blanking interval portion; the output of said additional keyed means being supplied to said second input terminal of said phase comparator.

5. Apparatus in accordance with claim 2 wherein said keyed means comprises:

first and second transistors of a first conductivity type, each having base, emitter and collector electrodes;

a current source coupled to said emitter electrodes, said current source being enabled only during said keying intervals recurring at a field rate; and a current mirror having an input responsive to the collector current of said second transistor, said current mirror including an output transistor of a second conductivity type, opposite to said first conductivity type, said output transistor having a collector electrode direct current conductively connected to the collector electrode of said first transistor;

wherein said first control voltage is applied between said base electrodes of said first and second transistors; and wherein said charge storage capacitor is coupled between said collector electrode of said second transistor and a point of reference potential.

* * * * *